US006636929B1

(12) United States Patent
Frantz et al.

(10) Patent No.: US 6,636,929 B1
(45) Date of Patent: Oct. 21, 2003

(54) USB VIRTUAL DEVICES

(75) Inventors: Christopher Frantz, Houston, TX (US); E. David Neufeld, Magnolia, TX (US); Doug Hascall, Houston, TX (US); Andrew Brown, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/544,573

(22) Filed: Apr. 6, 2000

(51) Int. Cl.$^7$ .............................................. G06F 13/00
(52) U.S. Cl. .................... 710/313; 710/47; 710/62; 710/67; 710/104; 710/300; 710/305
(58) Field of Search ............................ 710/47, 62, 67, 710/104, 300, 305, 313

(56) References Cited

U.S. PATENT DOCUMENTS

| 4,377,852 A | * | 3/1983 | Thompson ..................... 710/47 |
| 5,163,052 A | | 11/1992 | Evans et al. ................... 371/18 |
| 5,247,620 A | | 9/1993 | Fukuzawa et al. ............ 395/325 |
| 5,249,187 A | | 9/1993 | Bruckert et al. ............ 371/68.1 |
| 5,257,384 A | | 10/1993 | Farrand et al. .............. 395/725 |
| 5,272,382 A | | 12/1993 | Heald et al. ................... 307/66 |
| 5,283,905 A | | 2/1994 | Saadeh et al. ............... 395/750 |
| 5,287,461 A | | 2/1994 | Moore .......................... 395/275 |
| 5,309,563 A | | 5/1994 | Farrand et al. .............. 395/700 |
| 5,367,670 A | | 11/1994 | Ward et al. ................... 395/575 |
| 5,396,602 A | | 3/1995 | Amini et al. ................. 395/325 |
| 5,402,431 A | | 3/1995 | Saadeh et al. .............. 371/67.1 |
| 5,410,706 A | | 4/1995 | Farrand et al. .............. 395/700 |
| 5,423,050 A | | 6/1995 | Taylor et al. ................. 395/575 |
| 5,434,983 A | | 7/1995 | Yaso et al. ................... 395/325 |
| 5,450,551 A | | 9/1995 | Amini et al. ................. 395/325 |
| 5,469,577 A | | 11/1995 | Eng et al. ..................... 395/290 |
| 5,533,204 A | | 7/1996 | Tipley ........................ 395/288 |
| 5,564,025 A | | 10/1996 | De Freese et al. ........... 395/290 |
| 5,596,729 A | | 1/1997 | Lester et al. ................. 395/308 |
| 5,600,788 A | | 2/1997 | Lofgren et al. ......... 395/183.07 |
| 5,680,592 A | | 10/1997 | Priem .......................... 395/527 |
| 5,721,882 A | | 2/1998 | Singh .......................... 395/500 |
| 5,724,550 A | | 3/1998 | Stevens ....................... 395/473 |
| 5,729,762 A | | 3/1998 | Kardach et al. ............. 395/842 |

(List continued on next page.)

OTHER PUBLICATIONS

*Integrating Compaq Insight Manager and DIGITAL ServerWORKS Manager*, Compaq Computer Corporation, Sep. 1998 (36 p.).
*Compaq Insight Manager User Guide Version 4.21*, Compaq Computer Corporation, Jan. 1999, (256 p).

Primary Examiner—Jeffrey Gaffin
Assistant Examiner—Mohammad O. Farooq (57) ABSTRACT

A management sub-system connects via a USB bus to a server or computer being managed. The management sub-system also couples to a management console, which has a number of conventional peripherals, including CD-ROM, floppy drive, hard disk, keyboard, mouse, and the like. These peripherals are emulated as USB peripherals coupled to the server by the management sub-system. The management sub-system includes a Composite USB function logic device that connects to the USB controller in the server. The Composite USB function logic device emulates the various peripherals available at the management console, and provides configuration data to the USB controller consistent with the emulation. Consequently, the server sends and receives data from these peripherals at the management console, as if the peripherals were locally connected by the USB bus to the server. The management sub-system monitors the operation of the server and publishes a web page that can be viewed by a web browser at the management console. In addition to viewing this status information, the management console can operate as a virtual terminal, capable of downloading files and programs from any of the emulated peripherals to the server, and of receiving input signals from the emulated input devices.

20 Claims, 4 Drawing Sheets

U.S. PATENT DOCUMENTS

| | | |
|---|---|---|
| 5,732,212 A | 3/1998 | Perholtz et al. ......... 395/200.11 |
| 5,732,224 A | 3/1998 | Gulick et al. ................ 395/280 |
| 5,740,387 A | 4/1998 | Lambrecht et al. .......... 395/309 |
| 5,761,452 A | 6/1998 | Hooks et al. ................ 395/296 |
| 5,828,825 A | 10/1998 | Eskandari et al. ...... 395/183.03 |
| 5,834,856 A | 11/1998 | Tavallaei et al. ............... 307/64 |
| 5,864,653 A | 1/1999 | Tavallaei et al. ............. 315/181 |
| 5,864,659 A | 1/1999 | Kini ....................... 395/113.07 |
| 5,884,096 A | 3/1999 | Beasley et al. .............. 395/858 |
| 5,890,015 A * | 3/1999 | Garney et al. ................. 710/62 |
| 5,907,689 A | 5/1999 | Tavallaei et al. ............. 395/290 |
| 5,908,471 A | 6/1999 | Lach et al. .................. 714/805 |
| 5,933,614 A | 8/1999 | Tavallaei et al. ............. 395/309 |
| 6,081,856 A * | 6/2000 | Comer ........................ 710/67 |

\* cited by examiner

USB VIRTUAL DEVICES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a management system for a personal computer or server. More particularly, the invention relates to a management system that facilitates the transfer of input/output signals from a remotely-located management console to the computer being managed, so that input devices and peripheral devices at the remote management console can be used to provide data to the computer being managed as if those devices were connected as peripherals of the computer being managed. Still more particularly, the present invention relates to a system in which a personal computer or server couples to a management sub-system via a Universal Serial Bus ("USB"), and the management sub-system couples to a management console via a suitable connection, so that input/output devices and peripherals at the management console appear as input/output devices and peripherals of the personal computer or server being managed.

2. Background of the Invention

This invention involves the controlling of a personal computer or server using a virtual management console that is remotely located from the computer or server being managed (also referred to as "managed server" or "host computer"). The concept of controlling a computer from a virtual remote terminal is of great interest in many applications, especially in computer networks and in other situations where a user may not be able to physically access the computer. Computer networks such as LAN's (local area networks) have become one of the most important devices for storing and sharing data in a business, and thus, computer networks are one of the most critical pieces of equipment in a business office. A failure in the computer network can cause business operations to grind to a halt. Computer networks typically comprise a plurality of personal computers and other data processing devices connected together for information exchange. At the heart of the computer network is one or more file servers. In most computer networks, file servers are responsible for administrating and storing the documents generated by each of the personal computers (PC's) in the system. In addition to managing the network, file servers also preferably include the capability to monitor faults in the computer network. If a fault or security breach is detected, the file server provides a warning of the fault and in certain instances may, also provide diagnostic operations and may even implement corrective measures.

Files and data are maintained by a host processing system within the server. Servers are designed to provide work stations with fast access to files stored by the server. Accordingly, file servers embody a computer which responds to an operating system program (a popular operating system being, for example, WINDOWS NT®, or NETWARE®) to not only orchestrate the files but also to maintain file security, file backup, or other file management features. One important aspect which flows from maintaining these functions within a server is the capability to manage the server from a remote site, and to even permit management of the server from sites remote from the network. Recently there has been a steady increase in the number of servers that are used in businesses. The trend is to place one or more servers at each location of a business, rather than using a single main frame computer at a centralized location. Typically, a company has an individual or department responsible for administering all of the file servers. In many instances, the administrator or administration department is headquartered at one site. Thus, each of the servers must either be maintained and administrated remotely or else personnel must be transported to remote offices to permit on-site management.

Numerous monitoring systems are available to automatically alert designated persons when a PC, server or software application has failed. When such a failure occurs, the persons being notified may be in a remote location and not able to directly access the failed PC. In such an instance, the person may have access to a computer that is remotely connected to the failed computer or server, but may be unable to access the failed device. These may arise either because the processor in that device has failed and will no longer respond, the application running on the failed computer does not support remote PC access, or the failed computer not have the necessary software installed to permit a remote PC to access it. Various systems exist to permit a PC to be remotely or automatically rebooted, which in many cases restores the PC to normal operation. However, network administrators are reluctant to use such systems without first determining what may have caused the failure, so that similar failures can be prevented in the future.

Operating systems may permit access to the computer or server being managed from a remote site, often call a "virtual terminal." A virtual terminal, while not physically connected to the computer or server, nonetheless allows remote control of certain operations. Products such as Compaq Server Manager® and Compaq Insight Manager®, obtainable from Compaq Computer Corp., have attempted to address some of the issues involved in managing a network of distributed servers from a single, remote site. These products permit an administrator to be notified of a remote server failure, to reset the server from the remote site, and to access certain information provided on the server. Compaq's Insight Manager® permits remote maintenance of the file server as well as local and remote notification of errors. In addition, Insight Manager® permits the file server to be re-booted from a remote location or from any system on the network. Insight Manager® also provides control facilities including diagnostic capabilities to analyze the condition of the server system configuration and to update system firmware. Insight Manager® collects and monitors server data as well as data from each client in the network and allows the network manager to act on the data from a remote location or any work station on the network. In addition, Insight Manager® includes the capability to set user defined thresholds which permit the server to monitor system parameters and to alert the network manager when an error occurs. Notification in the event of an alert or a failure is delivered in many possible ways including on-screen messages, a pager, e-mail, fax and SNMP.

It is certainly beneficial to allow remote control of certain server functions, especially those needed to reset one or more servers within a network of servers. Downtime caused by server failure may be the most costly expense incurred in running a distributed computer system. The causes of server failure or "crash" are numerous. Any number of malfunctions or design flaws associated with the server hardware, server operating system or application programs running on a server may cause a server to crash. If a server crashes, then file access is often lost and business records are temporarily inaccessible until the cause of failure is fixed.

Various other software systems have been developed that link one PC with other PC's using modems connected over standard telephone lines either directly or via the Internet. These systems permit a host PC to be controlled by a remote PC. Function keys and menus are used in these systems to permit the remote PC to operate the host PC, as if the remote user was physically sitting at the host PC. Some examples of computer packages that function in this manner are Citrix, developed by Citrix Systems, Inc.; Crosstalk, developed by Digital Communications Associates, Inc; Procomm Plus, developed by Datastorm Technologies Inc.; or Unicom, developed by Data Graphics. In commonly assigned U.S. application Ser. No. 08/775,819, filed Dec. 31, 1996, entitled, "Diagnostic Board With System Video And Keyboard For Host Server System To Permit Remote Operations In A Virtual Terminal Mode," a system management module for a host server system is disclosed that includes a system management processor connected to a system management local bus. The system management local bus connects to the system PCI bus through a system management central control unit. The system management module includes a video controller and/or keyboard and mouse controller connected to the system management local bus to support remote consoling of the system management module, even in the event that the system bus fails. The teachings of U.S. application Ser. No. 08/775,819 are incorporated herein by reference.

While these systems permit the remote user to take control of the host computer, in the sense that the remote computer can transmit certain input signals such as keyboard and mouse commands, none of these systems permit the remote computer to load software from the peripheral drives of the remote computer to the host computer, or permit the other peripheral devices that might be available on the remote computer to be used in virtually operating the host computer. Thus, if a network administrator has software to be loaded on the host computer, the administrator must gain physical access to the host computer. Because most of the various peripheral devices of the remote computer are essentially unavailable in the remote administration of a host computer, the network administrator must physically visit the host computer to perform many basic maintenance tasks that simply cannot be performed at this time remotely. Thus, for example, if new software must be loaded on a managed server, a network administrator must physically travel to the site of that server. As a result, many companies that have network facilities at different locations must employ separate network administrators at each facility or else pay for transportation between the various facilities, thus greatly increasing the cost of administering the company's network.

It would be highly desirable to develop a virtual management console with enhanced capabilities, that could utilize the peripheral devices connected to the management console to transfer data to the host computer. As an example, it would be desirable to load a managed server with software contained on a CD-ROM that has been inserted into the CD-ROM drive of a remote management console. Despite the apparent advantages such a system would offer, to date no such system or solution has been presented in the computer industry.

BRIEF SUMMARY OF THE INVENTION

The problems noted above are solved in large part by a system that includes a managed server, a management sub-system connected to the server via a USB (Universal Serial Bus) connection, and a management console that may be located remotely from the managed server and coupled to the management sub-system via a suitable communication line, such as through an Ethernet, Internet, or Intranet connection. The management sub-system includes a composite USB function logic that presents an interface to the managed server indicating that multiple peripheral devices are available. The management sub-system includes a processor and memory for running USB device emulator software that controls the operation of the USB function logic, thus presenting to the managed server that various USB peripherals are available on that particular USB hub. The management sub-system also includes a device emulation communication agent for communicating with the management console over the communication line.

The remote management console may include a variety of conventional peripheral devices, including for example, a keyboard, mouse, CD-ROM drive, DVD-ROM drive, floppy drive, printer and monitor. The USB device emulator software, in conjunction with the composite USB function logic, informs the managed server that the peripheral devices present on the remote management console are available and coupled to the managed server on the USB bus. Thus the USB device emulator and composite USB function logic transmit appropriate USB-compatible signals to a USB controller in the managed server to inform the managed server of the presence and identity of these various peripheral devices.

Once these peripheral devices at the management console have been identified by the USB driver in the managed computer, signals are routed by the device emulation communication agent between the management sub-system and the management console. The remote management console includes a remote management application that interacts with the remote user, and which translates signals from the various peripheral devices, such as the CD-ROM drive, to an appropriate format for transmission to the management sub-system over the communication line. The device emulation communication agent and USB device emulator software translate these signals into a USB format for transmission to the managed server. Thus, by emulating USB peripheral devices through an appropriate composite USB function logic and supporting software, the peripheral devices at the remote management console may be used in a virtual mode, as if the peripheral devices were physically connected to the managed server on its USB bus.

In one implementation of the present invention, the management sub-system may publish a web page which can be viewed via the Internet by a user at the remote management console using web browser software. Through the USB device emulator and composite USB function logic, the user at the remote location may also use the mouse, keyboard and other input devices at the remote console to interact with the data presented on the web page. In addition, the management subsystem may present options or menu entries on the web page which may be selected by the user at the management console using input devices at the remote console. These options may include downloading software to the managed server from a peripheral drive at the remote management console, viewing or printing at the remote management console status information regarding the managed server, and various other selections that facilitate remote management of the managed server.

As an alternative, the management sub-system may transmit data to the remote management console via a direct Ethernet or telephone connection in response to a request from the remote console, or in the event that certain events occur at the server. According to the preferred embodiment, the data is formatted into menu entries or options enabling the remote user at the management console to initiate certain operations via the composite USB function logic and USB device emulator software.

According to another aspect of the present invention, the management sub-system preferably includes a device emulation communication agent that alerts the remote management console of any errors or malfunctions in the managed server, or managed network. In response, the user at the remote management console may communicate with the managed server via the composite USB function logic and associated software, thus enabling the remote user to diagnose and correct certain problems.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term "managed server" means a server or computer that is being, or which can be, managed from a remote console. The term "management console", conversely, means a computer or server that includes a console with input and output capabilities that can be used to manage the managed server. The term "computer" is used in this specification broadly and includes a personal computer, workstation, server, or other microprocessor-based device which can be programmed by a user to perform one or more functions and/or operations.

DETAILED DESCRIPTION OF THE PREFERRED EMBODIMENTS

Figure 1:
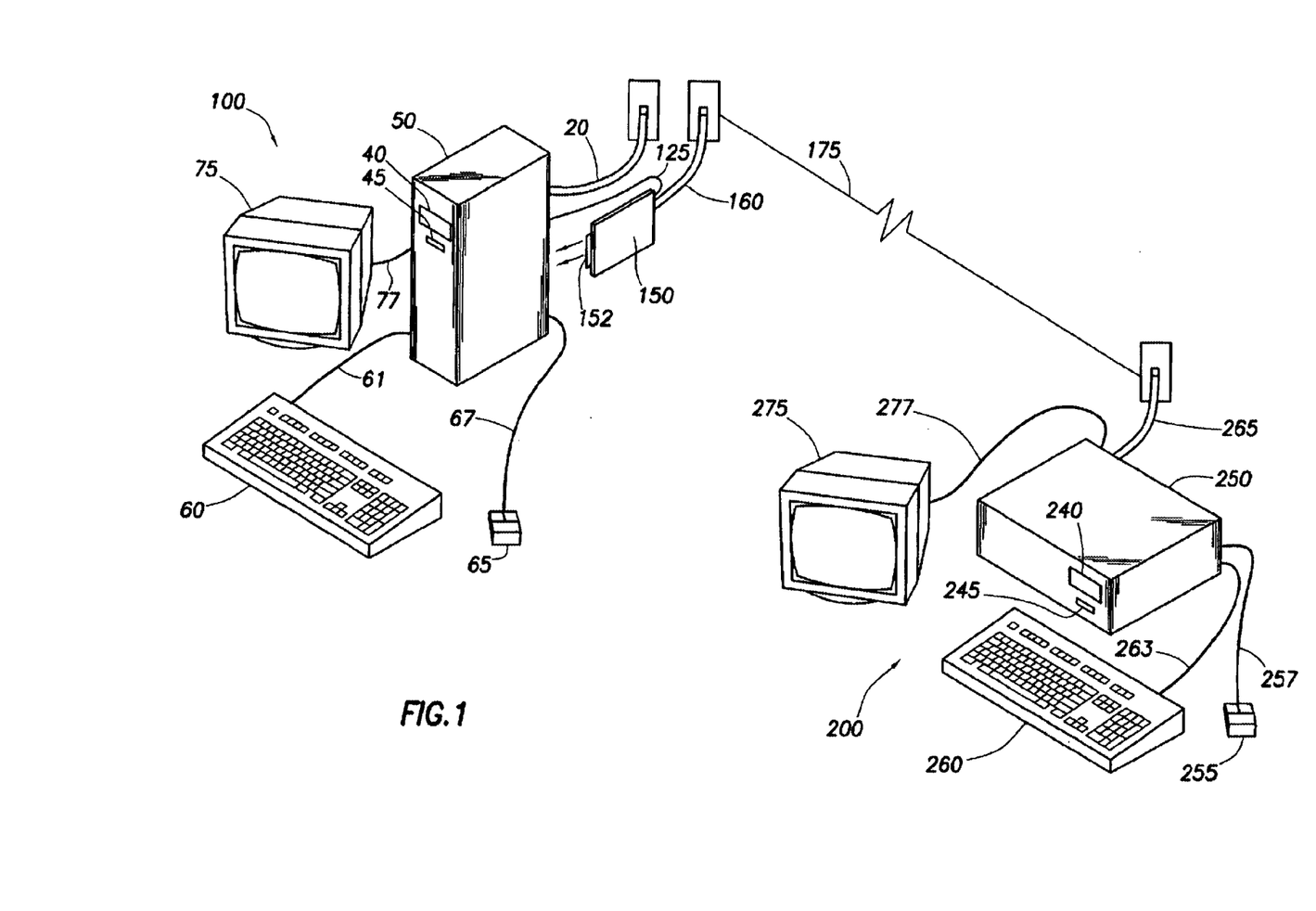
FIG. 1 shows a server with a management sub-system that connects via a communication line to a remote management console, according to an exemplary embodiment of the present invention.

Referring initially to FIG. 1, the present invention preferably comprises a managed computer or server system 100, a management sub-system 150 connected to the computer system 100 (or managed server) via a USB bus 125, and a management console 200 connected to the management sub-system via a communications line 175.

The computer system 100 constructed in accordance with a preferred embodiment of the invention generally comprises a computer chassis 50, a computer monitor 75, a keyboard 60 and a mouse 65. The chassis 50 may house various electrical components that perform the computing functions of the computer. In accordance with normal convention, the chassis 50 houses a CD-ROM drive 40 and a floppy disk drive 45. Various other drives may also be included in chassis 50, including for example, DVD-ROM drives, ZIP drives, PCMCIA slots/drives. These drives permit removable storage media to be inserted in appropriate receptacles, where the data stored on the media may be read by the circuitry in the computer.

The input devices, which in most instances comprises the keyboard 60 and mouse 65, connect via cables 61, 67, respectively to appropriate ports or connectors on the chassis 50 to permit the user to input instructions to the computer. Other input devices may also be provided in addition to, or in place of, those shown. In addition, the input devices may be coupled to the computer using wireless communications, such as infrared transmission. The computer monitor 75 may be separate from the chassis 50, or may be integral with the chassis, depending upon the desired configuration of the computer system. If separate from the chassis, a suitable cable 77 couples the monitor to the electronics in the chassis.

In the preferred embodiment, the computer system 100 comprises a server that couples via a suitable network connection to one or more personal computers. The server stores files and data on behalf of the network computers, and facilitates the interconnection and access of information by computers in the network. Thus, in accordance with normal convention, computer system 100 couples via an Ethernet cable 20 to one or more computers or servers in a local area network (LAN).

Referring still to FIG. 1, the management sub-system 150 preferably comprises a computer card that may be physically inserted into the chassis 50 of the computer system 100, as shown by the arrows in FIG. 1. Alternatively, the management sub-system may comprise a housing that is configured separately from the chassis 50, and connected by suitable connections to the computer system 100, as will be explained in more detail below. As yet another alternative, the management sub-system may be provided on a circuit board or a computer system board physically located within the chassis of the computer system 100. The management sub-system 150 connects to the computer system 100 via a USB (Universal Serial Bus) line 125. In the preferred embodiment, the management sub-system 150 also connects via connectors 152 on the edge of the card to a system bus in the computer system 100, such as, for example, a PCI (Peripheral Component Interconnect) bus. The connection to the system bus may be omitted if desired, with all communications between the computer system 100 and management sub-system 150 occurring through the USB bus 125. As shown in FIG. 1, the management sub-system preferably couples to an Ethernet line or to some other suitable network connection via line 160. Preferably, line 160 couples the management sub-system 150 to a telephone line or other suitable communication line, such as an ISDN line or DSL line to permit remote communication to the management console 200, which may be located remote from the local area network. Thus, the management sub-system may communicate with a management console 200, which may be located either on the network or at a location remote from the network. Communication line 175 is intended to represent either of these possibilities. One skilled in the art will appreciate that other network circuitry and connections in the form of routers, hubs, modems and the like may be used to implement the communication path to the management console 200. For the sake of simplicity, these additional components have been omitted.

Referring still to FIG. 1, the management console 200 couples to the communication line 175 via a suitable link 265. As noted above, the communication line 175 may comprise a network line, a telephone line, ISDN, DSL, or other communication link, an Internet connection, or a combination of one or more of these.

The management console 200 preferably includes a computer chassis 250, a computer monitor 275, a keyboard 260 and a mouse 255. The chassis 250 may house various electrical components that perform the various computing functions of the console, which preferably comprises a standard personal computer or web computer. In accordance with normal convention, the chassis 50 houses a CD-ROM drive 240 and a floppy disk drive 245. Various other drives may also be included as part of the chassis 250, including for example, DVD-ROM drives, ZIP drives, and PCMCIA slots/drives. These drives permit removable data storage media to be inserted in appropriate receptacles, where the data stored on the media may be read by the circuitry in the management console. As one skilled in the art will appreciate, other peripheral drives and devices also may be located external to the chassis 250, that connect to the console through suitable ports or connections.

The input devices, which typically comprise the keyboard 260 and mouse 255, connect via cables 263, 257, respectively to appropriate ports or connectors on the chassis 250 to permit the user to input instructions to the computer. Other input devices also may be provided in addition to, or in place of, those shown. In addition, the input devices may be coupled to the computer using wireless communications, such as infrared transmission. The computer monitor 275 may be located separate from the chassis 250, or may be formed integrally with the chassis, depending upon the desired configuration of the system. If separate from the chassis, a suitable cable 277 couples the monitor to the electronics in the chassis.

As will be described in more detail below, the management console 200 sends data from its various peripheral drives (including the CD-ROM drive, floppy drive, hard drive, DVD-ROM drive, etc.) and input devices (keyboard and mouse) over communication line 175 to the management sub-system 150, where the data is re-formatted to a USB protocol. Similarly, video signals from the managed server 100 are detected and transmitted by the management sub-system 150 to the management console to permit viewing of these video signals at the console monitor 275. In this manner, the peripheral devices and input devices at the management console 200 appear to be positioned locally with respect to the managed server 100, and directly connected to the managed server via a USB line 125.

Figure 2:
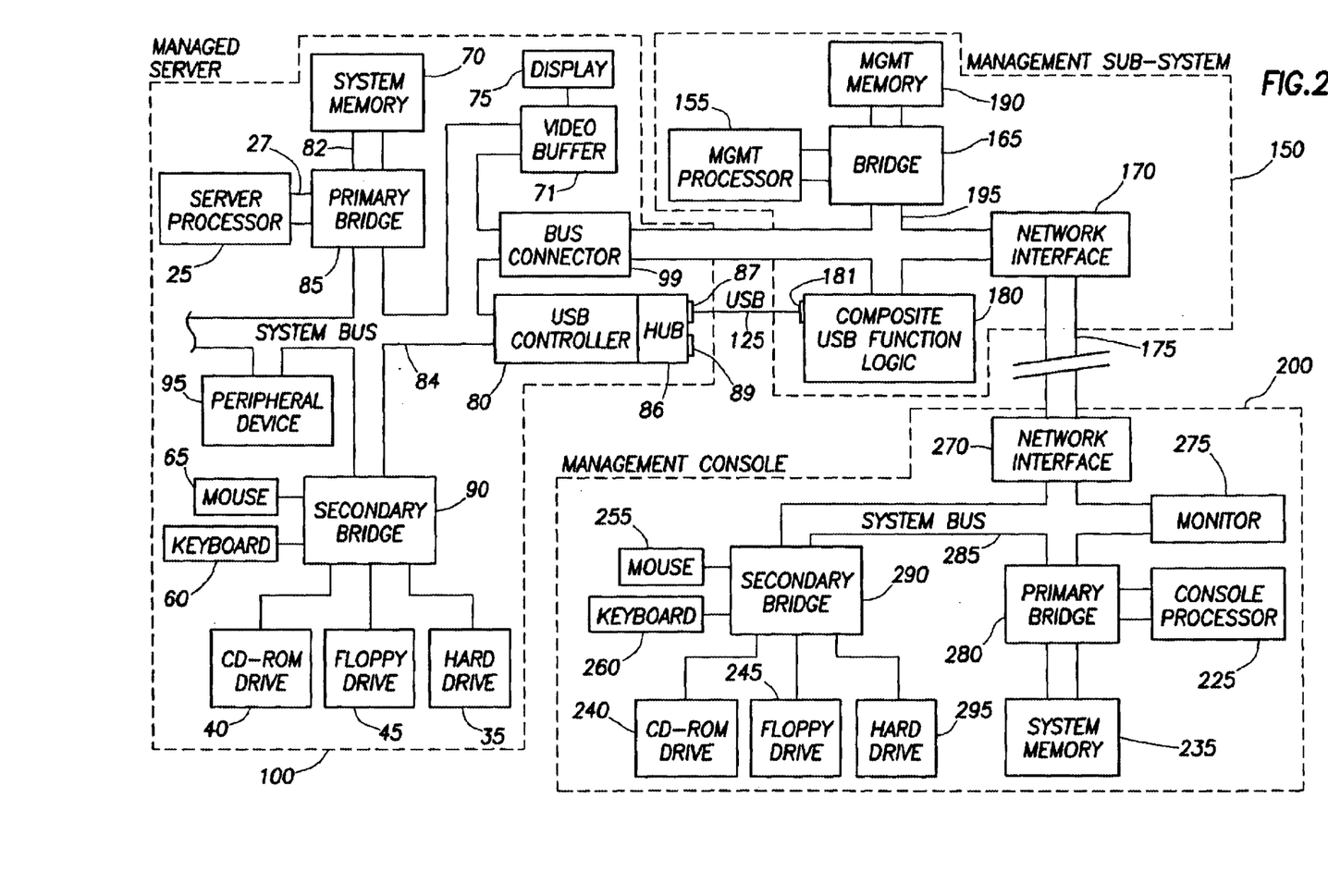
FIG. 2 is a block diagram that shows the electrical components implemented in the preferred embodiment of FIG. 1.

Referring now to FIG. 2, the managed server 100, management sub-system 150, and management console 200 are shown in more detail. Thus, as seen in FIG. 2, the managed server 100 preferably comprises a standard sever architecture, including a processor 25, system memory 70, bus bridges 85, 90, display 75, and a USB controller 80. The server processor 25 preferably couples to system 70 through a primary bridge device 85. It should be understood that other embodiments of the invention may include more than one processor or CPU. The processor may comprise any suitable microprocessor such as the Pentium II®, Pentium III®, or Celeron® processor by Intel®, the Athlon® processor by AMD, or other microprocessors from these or other manufacturers that may be used or configured for use in a computer system. The system memory 70 preferably comprises one or more memory devices such as any suitable type of random access memory. System memory may comprise, for example, synchronous dynamic random access memory ("SDRAM"), or other memory design suitable for use in a computer. The primary bridge 85 permits the processor 25 and other devices in computer system 100 to read data from or write data to system memory 70. Although not shown in FIG. 2, the primary bridge 85 may include an interface to an advanced graphics port (AGP) to support a graphics accelerator or other graphics devices (including a monitor) or memories that reside on an AGP bus.

The primary bridge 85 also preferably includes an interface to a system or peripheral bus 84. In the preferred embodiment, the system bus 84 comprises a Peripheral Component Interconnect ("PCI") bus, to which the primary bridge 85 interfaces. Various system bus compliant devices 95 may connect to the system bus 84. Through primary bridge 85, the processor 25 can communicate with various system devices, including the peripheral devices 95, USB controller 80, and other devices connected to the system bus 84 by bridge 90. In accordance with the protocol of various system busses, such as the PCI bus, various PCI bus masters may read data from and write data to system memory 70 via the primary bridge 85. The bridge 85 preferably contains a memory controller and arbiter (not specifically shown) to provide controlled and efficient access to system memory 70 by the various devices in computer system 100 such as processor 25 and other system devices.

Computer system 100 preferably also includes a secondary bridge device 90 which bridges the system bus 84 to other buses such as an Industry Standard Architecture ("ISA") bus, sub-ISA bus, or X-bus. Other devices, such as a hard disk drive 35, CD-ROM drive 40, and floppy drive 45, couple to secondary bridge device 90. Other drives may also be provided as desired. Drives 35, 40, and 45 can be accessed by the processor 25 through the primary bridge 85 and secondary bridge 90. One of ordinary skill in the art will recognize that one or more disk drive controllers (not shown) may also be included to provide effective data transfers to and from those drives. Similarly, the keyboard 60 and mouse 65 also preferably connect to the secondary bridge 90, which relays input signals from a local user to the processor 25. Also, as shown in FIG. 2, a video buffer 71 couples to the system bus 84 (or to some other bus, such as an AGP bus) to receive video signals to be displayed by a suitable computer monitor or display 75. One or more suitable bus connectors or slots 99 connect to the system bus to permit other compatible peripheral devices to be added to the system if desired.

Referring still to FIG. 2, computer system 100 preferably also includes a USB controller 80 to which various USB compatible peripheral devices may connect. Various USB peripheral devices are available in the industry, including keyboards, monitors, mice, printers, and speakers, among others. In addition, as one skilled in the art will understand, various composite peripheral devices may connect to the USB controller 80, including devices that combine the features of conventional items, such as printers/scanners/fax machines, and the like.

In accordance with the USB, specification, which is available from the USB website at www.usb.org, USB devices connect to one another via "ports." Accordingly, the USB host controller 80 includes a pair of "root" ports 87, 89 that may connect via USB-compatible cables to corresponding ports on suitable USB peripheral devices. It should be noted that the controller may include more than two ports on the root hub. The USB hub controller 80 includes a "root hub" 86 that includes the electrical components necessary to activate, configure and control the ports 87, 89.

As one skilled in the art will understand, the USB communication scheme advantageously permits devices to be linked together, without each peripheral device requiring a direct connection to the computer USB controller 80. The Universal Serial Bus ("USB") standard was introduced recently to address concerns regarding the installation of new peripheral devices that are added to an individual computer system. The USB generally provides a solution for attaching peripherals after a computer system has been initialized. Devices attached to the USB ports can include additional connections for attaching other USB devices. For example, a keyboard may connect to the computer chassis via a USB cable to a USB connector on the chassis. The keyboard also may have one or more additional USB connections to permit a mouse to connect to the keyboard. Thus, USB-compatible peripheral devices can be linked together making connection of peripherals easier than with conventional computer systems. USB provides other benefits such as the ability to support "plug and play" operation. Plug and play operation means that a device can be connected to a computer that is already running and the device will automatically be configured by the operating system and be ready for immediate use.

In accordance with the preferred embodiment of the invention, the USB controller shown in FIG. 2 permits communications to occur in accordance with the USB standards. In accordance with the preferred embodiment, Universal Serial Bus Revision 2.0 is implemented in the present invention. Details regarding USB protocols and formats are available from the USB specification. A few details of the USB bus are provided herein for background purposes.

Each USB device is adapted to transmit in accordance with USB standards. At least one transceiver is provided in each USB device to permit signals to be both transmitted and received from each device. Each USB device receives data on an input pin and generates a pair of differential output signals in accordance with known techniques. As is well-known to those of ordinary skill in the art, the differential signal pair includes D+ and D−, which represent the output data signal to the transmitter, which are 180 degrees out of phase. Differential signaling permits noise induced on the cable to be attenuated by a receiver having a sufficiently high common mode rejection. During initialization, the USB controller 80 transmits signals to the USB peripherals coupled to the USB bus to identify the number and type of devices present, and to assign unique addresses to each device present. This process is referred to in the USB specification as enumeration.

Referring still to FIG. 2, the management sub-system 150 preferably comprises a management processor 155, memory 190, a composite USB function logic 180 and a network interface (NIC) card 170. The management processor 155 preferably provides information to the managed server system 100 relating to error detection and system administration to reduce the load on the server processor 25. In addition, according to the preferred embodiment, the management processor 155 also functions as a "survival" processor in the event the server processor 25 "hangs" or is rendered inoperable by system error. The management processor 155 thus permits access to the server system 100 for purposes of accessing system components via either the USB bus 125 or the system bus 84 to determine the source of the error. The management processor 155 also preferably detects other system errors and isolates the source of the errors to permit the managed server system 100 to continue operations.

The management memory 190 includes random access memory as the working memory of the management processor 155, preferably in the form of dynamic random access memory (DRAM). Other types of memory circuits also may be used such as static random access memory (SRAM) circuits, if desired. In addition, the management memory may also include read-only memory to permanently stored code for execution by the management processor. Thus, the management memory 190 is used to store data and code for execution by the management processor 155.

The bus bridge 165 preferably couples the management processor to management memory 190. Alternatively, the functions of bus bridge 165 may be integrated into the management processor 155, or to some other management component. The bus bridge preferably includes a memory controller to control and properly format transactions to the memory. In addition, the bus bridge also preferably couples the management processor to a management system bus 195. Arbitration of the management system bus 195 preferably is controlled by arbitration logic in the bus bridge 165. In the preferred embodiment the management local bus comprises a PCI-style bus that may couple via a suitable bridge (such as bus connector 99) to the system bus 84 in the managed server 100. Alternatively, the management local bus may comprise any of a variety of other buses, including for example, an ISA (Industry Standard Architecture) bus.

The management processor 155 preferably has the same privileges as the server processor 25. Thus, the management processor 155 can reboot the system 100 without accessing the server processor 25. In the event that the management processor is removed from the server system bus 84, or the bus fails, the management processor 155 can still operate and communicate with the other devices connected to the management system bus 195.

Also connected to the management system bus 195 is the composite USB function logic 180 and network interface 170. The inclusion of the network interface 170 on the management system bus 195 permits the management processor 155 to communicate with other components on the network or to remote locations via a modem that is provided at a convenient location in the network. Thus, the management processor is capable of receiving data from a remote console and emulating USB peripheral devices, as described in more detail below.

The composite USB function logic 180 preferably couples the management processor via the management system bus 195. As an alternative to a composite USB function logic, a hub may be used which then couples to emulation logic for each of the peripheral drives and input devices provided in the management sub-system. Thus, the composite USB function logic is intended to encompass both a unitary composite emulation device and a hub with separate logic for each of the USB devices to be emulated.

The USB function logic 180 includes a port 181 that connects via a standard USB line 125 to the USB controller 80 in the managed server 100. The composite USB function logic mimics a number of standard composite USB device (such as a CD-ROM, floppy disk, keyboard, mouse and monitor) by communicating with the USB controller 80, and responding to requests from the USB controller 80 to the emulated peripherals. In particular, when the USB controller 80 is enumerating devices on the USB bus, the USB function logic 180 sends back configuration data to the USB controller identifying the various USB devices that will be emulated by the management sub-system 150. Thus, if console 200 includes a CD-ROM drive, a floppy drive, a keyboard, a mouse, a printer, and a monitor, the composite USB function logic, under the control of the management processor 155, will send configuration data to the USB controller 80 identifying that each of these devices are present on the USB line 125. In the preferred embodiment, the available devices at the remote console are predetermined and the composite USB function logic 180 is programmed with this information. As an alternative, a set of configuration registers may be provided in the management sub-system that identify the peripheral devices to be emulated by the composite USB function logic 180.

In the preferred embodiment, the management sub-system 150 preferably connects to the managed server 100 via the system bus 84 and the USB bus 125. The management sub-system 150 may be provided integrally with the computer system 100 on a system board, or may be provided as a plug-in board (as shown in FIG. 1) for connecting to the system bus 84 in accordance with known techniques. The system management sub-system 150 detects failures in the computer system 100 via the system bus and preferably includes the capability to correct some of those failures. As to the failures that cannot be corrected, the management sub-system 150 preferably is capable of isolating the source of the failure to enable the computer system to continue operation, with limited capabilities. In response to an error or failure, the management sub-system 150 preferably transmits an error signal to a systems administrator to initiate error analysis followed in some instances by a system reset. In accordance with the preferred embodiment, the error analysis and reset may be performed remotely.

Referring still to FIG. 2, the remote console 200 couples to the management sub-system via communications link 175. The communications link 175 may comprise an Ethernet connection, a telephone line, a wireless communications link, or any other suitable communications media. It should also be understood that a combination of different types of communication media may be used to implement communications link 175. Thus, for example, the network interface 170 may connect to an Ethernet network, which couples to a modem, which in turn connects to a telephone line. It should also be understood that the connection between the management sub-system 150 and management console 200 may be through implemented using the Internet, or through a company's intranet.

In the preferred embodiment, the remote console 200 comprises a conventional personal computer, and thus preferably includes a console processor 225, memory 235, primary bridge 280 and secondary bridge 290, a monitor 275, and a network interface 270. The console processor 225 preferably couples to system memory 235 through a primary bus bridge 280. It should be understood that other embodiments of the invention may include more than one processor. The processor may comprise any suitable microprocessor such as the Pentium II®, Pentium III®, or Celeron® processor by Intel®, the Athlon® processor by AMD, or other microprocessors from these or other manufacturers that may be used or configured for use in a computer system. The system memory 235 preferably comprises one or more memory devices such as any suitable type of random access memory. System memory may comprise, for example, synchronous dynamic random access memory ("SDRAM"), or other memory designs suitable for use in a computer. The primary bridge 280 permits the console processor 225 and other devices in the management console 200 to read data from or write data to memory 235. Although not shown in FIG. 2, the primary bridge 280 may include an interface to an advanced graphics port (AGP) to support a graphics accelerator or other graphics devices (including a monitor) or memories that reside on an AGP bus.

The primary bridge 280 also preferably includes an interface to a system bus 285. In the preferred embodiment, the system bus 285 comprises a Peripheral Component Interconnect ("PCI") bus, to which the primary bridge 280 interfaces. Various system bus compliant devices may connect to the system bus 285. Through primary bridge 280, the processor 225 can communicate with various system devices included in the remote console 200. In accordance with the protocol of various system busses, such as the PCI bus, various PCI bus masters may read data from and write data to system memory 235 via the primary bridge 280. The bridge 280 preferably contains a memory controller and arbiter (not specifically shown) to provide controlled and efficient access to system memory 235 by the various devices in the console 200.

The management console 200 preferably also includes a secondary bus bridge 290 which bridges the system bus 285 to other bus such as an Industry Standard Architecture ("ISA") bus, sub-ISA bus, or X bus. Other devices, such as a hard disk drive 295, CD-ROM drive 240, and floppy drive 245, couple to secondary bus bridge 290. Other drives may also be provided is desired. Drives 240, 245, and 295 can be accessed by the processor 225 through the primary bridge 280 and secondary bridge 290. One of ordinary skill in the art will recognize that one or more disk drive controllers (not shown) may also be included to provide effective data transfers to and from these drives. Similarly, the keyboard 260 and mouse 255 also preferably connect to the secondary bridge 290. Also, a video monitor 275 couples to the system bus 285 (or some other bus, such as an AGP bus) to receive video signals to be displayed). Still referring to FIG. 2, the management console 200 also preferably includes a network interface 270 or some other device for coupling the console 200 to be management sub-system. The network interface preferably interfaces the system bus 285 to the communications link 175.

Figure 3:
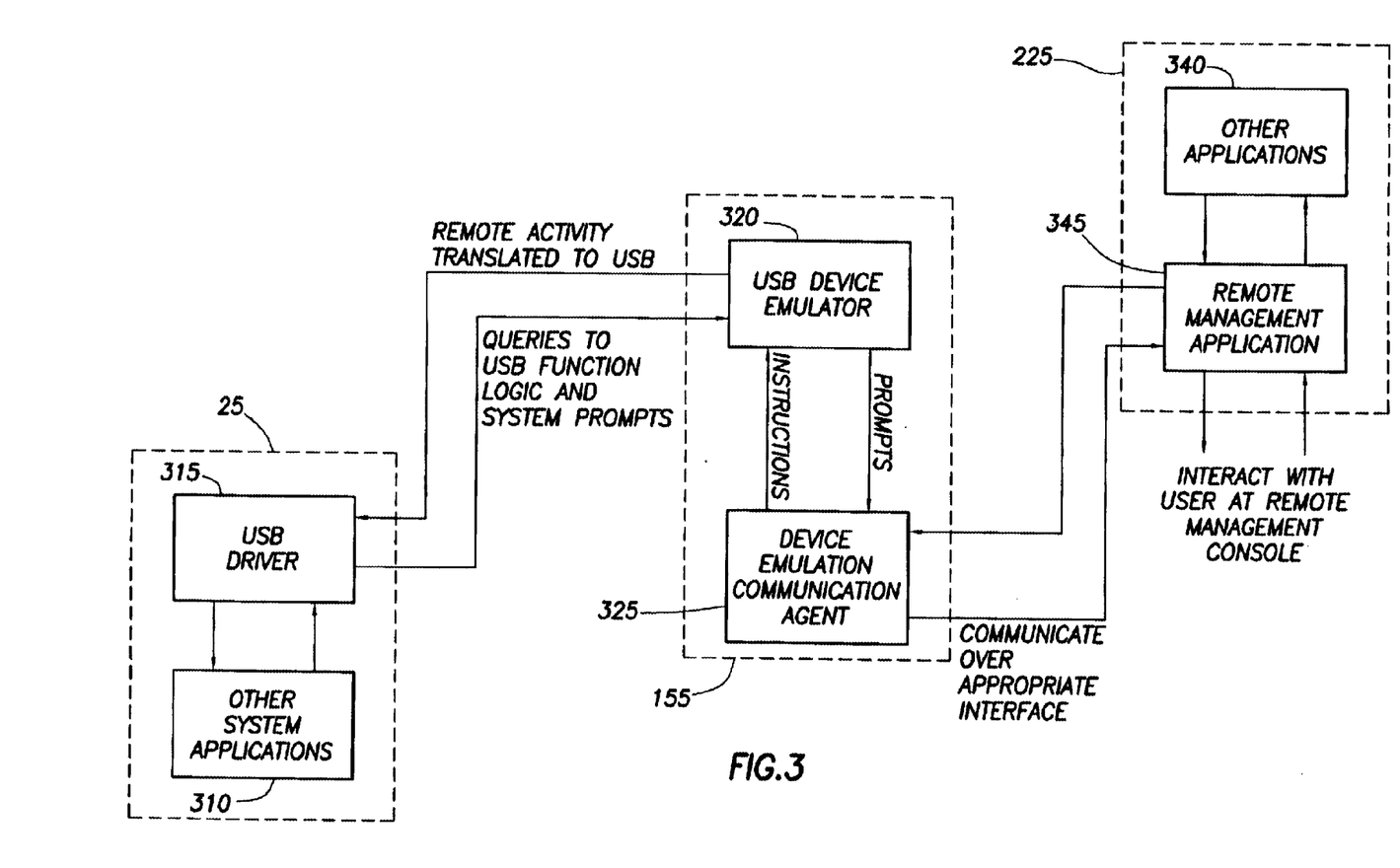
FIG. 3 is a block diagram showing the general interrelationship of software applications that are implemented in the preferred embodiment of FIG. 1.

Referring now to FIGS. 2 and 3, some of the software applications that preferably are implemented in the present invention will now be described. As shown in FIG. 3, the managed server preferably includes a USB driver 315, which is stored in permanent memory of the managed server and loaded into working memory during use by the server processor. The USB driver 315 operates to control transactions made by the USB controller to USB peripherals, in accordance with normal convention. Thus, the USB driver controls queries, instructions and prompts to the various USB peripherals in the system, including the composite USB function logic. As noted above, in the preferred embodiment of the present invention, Revision 2.0 of the Universal Serial Bus is implemented. Various other software applications and drivers 310 are included in the managed server, including for example device drivers for each of the USB emulated peripherals included in the remote management console.

In addition to management applications which may be stored in the management sub-system for execution by the management processor, a USB device emulator application 320 and a device emulation communication agent 325 are preferably stored in management memory and executed by the management processor. The USB device emulator application 320 controls the operation of the composite USB function logic. Thus, the USB device emulator 320 mimics the operation of the various peripherals available at the management console and provides the necessary configuration data to the USB controller in the managed server to support this emulation. The management sub-system communicates with the management console through the device emulation communication agent 325. The communication agent 325 facilitates communication over the communications link, and thus formats and translates signals between the management sub-system and the communications link.

The remote console preferably includes a remote management application 345 that interacts with the user at the management console, and which communicates with the device emulation communication agent 325 at the management sub-system. Various other applications and drivers 340 are provided in the management console to support other console operations.

Figure 4:
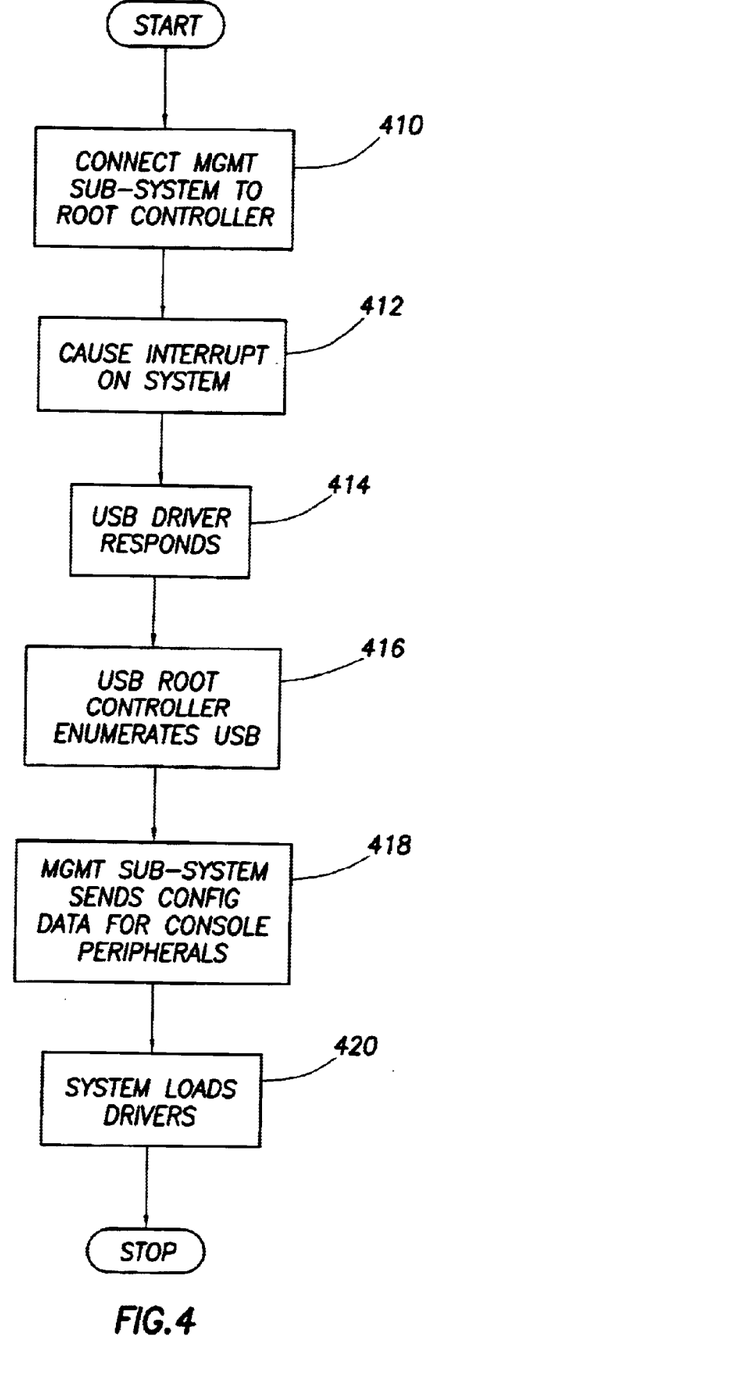
FIG. 4 is a flowchart depicting the initialization routine by which the composite USB function logic of the management sub-system interfaces with the USB controller of the managed server.

Referring now to FIGS. 2, 3 and 4, the initialization of the composite USB function logic 180 will now be described. When the composite USB function logic 180 is first connected to the USB line 125 in step 410, the root hub 86 to which the composite USB function logic 180 is connected informs the USB driver software 315 by generating an interrupt as shown in step 412. The server processor 25, executing the USB driver 315, responds in step 414 and determines the nature of the change in status of the hub 86. Once the server processor 25 knows the port 87 to which the new USB peripheral has been installed, the USB driver 315 resets the port 87. The server processor 25 assigns a unique address to the composite USB function logic 180. Next, the USB driver software 315 enumerates the composite USB function logic in step 416 by reading the device descriptor to determine the actual maximum data size that the composite USB function logic 180 can use. In the preferred embodiment, this device descriptor in the composite USB function logic 180 is pre-programmed to include all peripheral functions that will be implemented in the management console 200. Thus, for example, the composite USB function logic 180, as controlled by the USB device emulator software 320, will send a device descriptor encompassing the CD-ROM drive 240, floppy drive 245, hard drive 295, keyboard 260, mouse 255 and monitor 275 that are resident at the management console 200. In step 418, the composite USB function logic 180 in the management sub-system 150 sends configuration data for all of the peripheral devices that will be implemented in the management console 200. Based on this configuration information, the USB driver 315 assigns a configuration value to the composite USB function logic 180. In step 420, the server processor loads the necessary drivers to support the remote console peripherals that were configured by the USB device emulator 320 in conjunction with the composite USB function logic 180.

In the preferred embodiment, the contents of the video buffer 71 are periodically relayed to the management console 200 by the management sub-system processor 155, to permit the remote user to view the video contents on monitor 275. The video data may be compressed as desired prior to transmission to the remote console for viewing. As a result, the video data from the managed server 100 may be viewed remotely at the management console, and the input devices 255, 260 may be used to select options that appear in the video data. In addition, selection of certain options in the video data, such as downloading files, data or applications, can cause the server processor 25 to prompt the emulated data storage peripherals at the remote console 200 for the requested data, using conventional USB signals, that are then translated by the management processor 155 and relayed to the management console 200.

According to the preferred embodiment, the management processor 155 generates a website to list available options to the user at the management console. These options might include downloading software from the CD-ROM, floppy drive, or hard drive to the managed console, generating a status report for display at the remote site, running system tests, or any of a variety of other operations that can be programmed into the system. If desired, the website can be published to the management console either through the Internet, directly via a telephone connection, or over a network. Thus, the management sub-system preferably is programmed to collect status data regarding the operation of the managed server and/or the local area network. The management sub-system also preferably is programmed to function as a web server, such that it can communicate over an Internet, intranet or similar technology connection.

The management console 200 preferably runs an Internet web browser software package, such as MICROSOFT's INTERNET EXPLORER or NETSCAPE's NAVIGATOR software, although any generic browser may be used. The management console 200 may connect to the Internet directly or through a service provider. Similarly, both the management console 200 and the management sub-system 150 may connect to the Internet using any communication media, including a standard analog phone line connection, an ISDN connection, a T1 connection, a DSL connection, a satellite connection, direct wire connection, or the like. The management console 200 may also be directly connected to the management sub-system, bypassing the public Internet, such as through the use of intranet and similar technology.

During operation, the management processor 155 monitors the operation and performance of the server system 100. The management processor 155 then displays data reflecting the server operation and performance on a web page real-time. The management processor may also display historical and other measurement or configuration data. The management console 200 accesses these measurements by simply entering the respective URL address for the managed server 100. In response to the selection of this address, the management processor is contacted and replies with its web page, which preferably includes a list of current server conditions. Other features and details available through the management sub-system may be selected from menu entries in the web page.

While a preferred embodiment of the invention has been shown and described, modifications there of can be made by one skilled in the art without departing from the spirit of the invention. It should be understood that the principles of the present invention are applicable to any system in which a computer, workstation or server is managed from a management console by emulating USB peripherals of the managed computer with peripherals of the management console.

What is claimed is:

1. A system for managing a computer, comprising:
    a computer system including a processor and a USB (Universal Serial Bus) controller coupled to the processor via a system bus, said USB controller including a hub and at least one port for coupling USB peripherals to the processor of said computer system;

a management sub-system including a management processor and a composite USB function logic, said composite USB function logic coupling to a port of said USB controller via a USB line, and wherein said management processor executes USB device emulator software that controls operations of said composite USB function logic;

a management console coupled to said management sub-system via a communications link, said management console including a console processor, monitor, one or more input devices, one or more peripheral drives, and wherein said management console translates data from said input device and said peripheral driver for transmission to said management sub-system via said communication links; and wherein said composite USB function logic emulates the input device and peripheral drive as USB peripherals so that the computer system performs data transaction to said composite USB function logic as if the input device and peripheral driver were connected to said USB line.

2. The system of claim 1, wherein said one or more input devices at said management console comprise one or more of a mouse and a keyboard.

3. The system of claim 1, wherein said one or more peripheral drives comprise one or more of a CD-ROM drive, hard drive, and a floppy drive.

4. The system of claim 1, wherein said management sub-system further comprises a network interface that couples to a local area network.

5. The system of claim 4, wherein said local area network couples to said management console via a telephone line.

6. The system of claim 4, wherein said local area network couples to said management console via the Internet.

7. The system of claim 1, wherein said management sub-system also couples to said computer system via said system bus.

8. A system for managing a computer, comprising:

a computer system including a processor and a USB (Universal Serial Bus) controller coupled to the processor via a system bus, said USB controller including a hub and at least one port for coupling USB peripherals to the processor of said computer system;

a management sub-system including a management processor and a composite USB function logic, said composite USB function logic coupling to a port of said USB controller via a USB line;

a management console coupled to said management sub-system via a communications link, said management console including a console processor, monitor, one or more input devices, one or more peripheral drives, and wherein said management console translates data from said input device and said peripheral driver for transmission to said management sub-system via said communication links;

wherein said composite USB function logic emulates the input device and peripheral drive as USB peripherals so that the computer system performs data transaction to said composite USB function logic as if the input device and peripheral driver were connected to said USB line; and wherein said management processor executes the USB device emulator software that controls the emulation of said input device and said peripheral drive by the composite USB function logic.

9. A system for managing a computer, comprising:

a computer system including a processor and a USB (Universal Serial Bus) controller coupled to the processor via a system bus, said USB controller including a hub and at least one port for coupling USB peripherals to the processor of said computer system;

a management sub-system including a management processor and a composite USB function logic, said composite USB function logic coupling to a port of said USB controller via a USB line;

a management console coupled to said management sub-system via a communications link, said management console including a console processor, monitor, one or more input devices, one or more peripheral drives, and wherein said management console translates data from said input device and said peripheral driver for transmission to said management sub-system via said communication links;

wherein said composite USB function logic emulates the input device and peripheral drive as USB peripherals so that the computer system performs data transaction to said composite USB function logic as if the input device and peripheral driver were connected to said USB line; and wherein said management processor also executes device emulation communication agent software that communicates with remote management application software executed by said console processor.

10. A system for managing a computer, comprising:

a computer system including a processor and a USB (Universal Serial Bus) controller coupled to the processor via a system bus, said USB controller including a hub and at least one port for coupling USB peripherals to the processor of said computer system;

a management sub-system including a management processor and a composite USB function logic, said composite USB function logic coupling to a port of said USB controller via a USB line;

a management console coupled to said management sub-system via a communications link, said management console including a console processor, monitor, one or more input devices, one or more peripheral drives, and wherein said management console translates data from said input device and said peripheral driver for transmission to said management sub-system via said communication links;

wherein said composite USB function logic emulates the input device and peripheral drive as USB peripherals so that the computer system performs data transaction to said composite USB function logic as if the input device and peripheral driver were connected to said USB line;

wherein said management sub-system further comprises a network interface that couples to a local area network, wherein said local area network couples to said management console via the Internet; and wherein said management sub-system monitors performance of the computer system, and publishes a web page with a URL address that indicates the computer system performance.

11. The system of claim 10, wherein said remote console includes a web browser software that accesses said web page using the URL address of the management sub-system.

12. A system for managing a computer, comprising:

a computer system including a processor and a USB (Universal Serial Bus) controller coupled to the processor via a system bus, said USB controller including a hub and at least one port for coupling USB peripherals to the processor of said computer system;

a management sub-system including a management processor and a composite USB function logic, said composite USB function logic coupling to a port of said USB controller via a USB line;

a management console coupled to said management sub-system via a communications link, said management console including a console processor, monitor, one or more input devices, one or more peripheral drives, and wherein said management console translates data from said input device and said peripheral driver for transmission to said management sub-system via said communication links;

wherein said composite USB function logic emulates the input device and peripheral drive as USB peripherals so that the computer system performs data transaction to said composite USB function logic as if the input device and peripheral driver were connected to said USB line;

wherein said management sub-system also couples to said computer system via said system bus, and wherein said management sub-system is mounted on a system motherboard in said computer system.

13. A managed computer system capable of being virtually controlled by a remote management console that includes input devices and peripheral drives, said managed computer system comprising:

a processor;
a system bus coupled to process by a bus bridge;
a USB controller coupled to said system bus, said USB controller including a hub and at least one USB port;
a management sub-system coupled to said USB port, said management sub-system including:
a management processor;
a memory coupled to said management processor for storing software and data;
a network interface for coupling said computer system to said remote management console via a communications link;
a composite USB function logic connected to said USB port via a USB line, and coupled to said management processor, wherein said management processor comprises an USB device emulator software that controls operations of said composite USB function logic; and
wherein said composite USB function logic emulates the input device and peripheral drives of the remote management console as USB peripheral devices so that the computer system processor and USB controller operates as if the input devices and peripheral drives of the remote management console are resident on said USB line.

14. The system of claim 13, further comprising a bus connector coupled to said system bus to permit additional peripheral devices to be plugged into the system bus.

15. The system of claim 13, wherein said management sub-system couples to said management console via the Internet.

16. A managed computer system capable of being virtually controlled by a remote management console that includes input devices and peripheral drives, said managed computer system comprising:

a processor;
a system bus coupled to process by a bus bridge;

a USB controller coupled to said system bus, said USB controller including a hub and at least one USB Port;
a management sub-system coupled to said USB port, said management sub-system including:
a management processor;
a memory coupled to said management processor for storing software and data;
a network interface for coupling said computer system to said remote management console via a communications link;
a composite USB function logic connected to said USB port via a USB line, and coupled to said management;
a bus connector coupled to said system bus to permit additional peripheral devices to be plugged into the system bus;
wherein said composite USB function logic emulates the input device and peripheral drives of the remote management console as USB peripheral devices so that the computer system processor and USB controller operates as if the input devices and peripheral drives of the remote management console are resident on said USB line; and
wherein said management sub-system is mounted on a system motherboard.

17. A managed computer system capable of being virtually controlled by a remote management console that includes input devices and peripheral drives, said managed computer system comprising:

a processor;
a system bus coupled to process by a bus bridge;
a USB controller coupled to said system bus, said USB controller including a hub and at least one USB port;
a management sub-system coupled to said USB port, said management sub-system including:
a management processor;
a memory coupled to said management processor for storing software and data;
a network interface for coupling said computer system to said remote management console via a communications link;
a composite USB function logic connected to said USB port via a USB line, and coupled to said management;
wherein said composite USB function logic emulates the input device and peripheral drives of the remote management console as USB peripheral devices so that the computer system processor and USB controller operates as if the input devices and peripheral drives of the remote management console are resident on said USB line; and
wherein said management processor includes USB device emulator software that controls the operation of said composite USB function logic.

18. A managed computer system capable of being virtually controlled by a remote management console that includes input devices and peripheral drives, said managed computer system comprising:

a processor;
a system bus coupled to process by a bus bridge;
a USB controller coupled to said system bus, said USB controller including a hub and at least one USB port;
a management sub-system coupled to said USB port, said management sub-system including:

a management processor;

a memory coupled to said management processor for storing software and data;

a network interface for coupling said computer system to said remote management console via a communications link;

a composite USB function logic connected to said USB port via a USB line, and coupled to said management;

wherein said composite USB function logic emulates the input device and peripheral drives of the remote management console as USB peripheral devices so that the computer system processor and USB controller operates as if the input devices and peripheral drives of the remote management console are resident on said USB line; and wherein said management sub-system monitors for failures of the computer system, and publishes a web page with a URL address that indicates the computer system failures.

19. A managed computer system capable of being virtually controlled by a remote management console that includes input devices and peripheral drives, said managed computer system comprising:

a processor;

a system bus coupled to process by a bus bridge;

a USB controller coupled to said system bus, said USB controller including a hub and at least one USB port;

a management sub-system coupled to said USB port, said management sub-system including:

a management processor;

a memory coupled to said management processor for storing software and data;

a network interface for coupling said computer system to said remote management console via a communications link;

a composite USB function logic connected to said USB port via a USB line, and coupled to said management;

wherein said composite USB function logic emulates the input device and peripheral drives of the remote management console as USB peripheral devices so that the computer system processor and USB controller operates as if the input devices and peripheral drives of the remote management console are resident on said USB line; and wherein said composite USB function logic comprises a hub coupled to individual logic devices that separately emulate each of the peripheral drives and input devices available in the management console.

20. A method of emulating peripheral drives and input devices of a management console as if they were resident on a computer system as USB peripherals, said computer system including a USB controller coupled via a system bus to a system processor, comprising acts of:

connecting a composite USB controller to the system processor indicating a change in state of the USB port status;

generating an interrupt from the USB controller to the system processor indicating a change in state of the USB port status;

loading a USB driver in the system processor;

enumerating the newly-connected composite USB logic device;

transferring configuration data from the composite USB logic device to the USB driver for the peripheral drives and input devices of the management console;

loading the drivers for the peripheral drives and input devices into said system processor.

* * * * *